2,891,069

5-(2,4-DIHALOPHENYL)HYDANTOINS

James R. Thornton, Johnson County, Kans., and David F. Marsh, deceased, late of Montgomery County, Pa., by Audrey S. Marsh, executrix, Montgomery County, Pa., assignors, by direct and mesne assignments, to Spencer Chemical Company, Kansas City, Mo., a corporation of Missouri No Drawing. Application July 1, 1957
Serial No. 669,386

10 Claims. (Cl. 260—309.5)

This invention relates to new 5-substituted hydantoins, more specifically to new 5-(2,4-dihalophenyl)hydantoins.

The new 5-(2,5-dihalophenyl)hydantoins of this invention have utility as plant growth regulants.

Hydantoin may be described as a nitrogen containing heterocyclic compound, having a 5-membered ring structure. Two of the members of the ring are imido nitrogen atoms, characterized by having one hydrogen atom attached to the nitrogen atom. The three remaining members of the ring are carbon atoms, two of which have oxygen atoms attached thereto. The third carbon atom, in what is generally referred to as the 5-position of the ring, has two hydrogen atoms attached. The new compounds of this invention are 5-substituted hydantoins, characterized by having one of the hydrogen atoms of the 5-carbon replaced by a 2,4-dihalophenyl radical.

The new 5-(2,4-dihalophenyl)hydantoins of this invention have the formula:

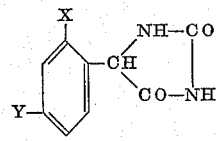

in which X and Y represent like or different halogen atoms, particularly chlorine and/or bromine.

The new 5-(2,4-dihalophenyl)hydantoins may be prepared by the reaction of an appropriate 2,4-dihalobenzaldehyde with an alkali metal cyanide, such as sodium cyanide or potassium cyanide, and ammonium carbonate. An inert solvent or diluent, such as aqueous ethanol, may be used to maintain the reaction at the optimum reaction temperature of about 60° C., which is the approximate decomposition temperature of the ammonium carbonate. It is preferable to use a stoichiometric excess of ammonium carbonate, thereby providing a ready source of amonia and carbon dioxide upon decomposition. The resulting alkaline solution of the reaction product is acidified with hydrochloric acid to precipitate the crystalline hydantoin. The product may be purified by recrystallization from a suitable solvent such as aqueous ethanol or by its reprecipitation from water by the acidification of an aqueous solution of the sodium salt.

The 5-(2,4-dihalophenyl)hydantoins are crystalline solids that are readily soluble in alcohol and other organic solvents but insoluble in water.

Because of the acidic character of the hydantoin ring, the 5-(2,4-dihalophenyl)hydantoins form salts with cation supplying compounds. Alkali metal and alkaline earth metal salts are conveniently formed by contacting a 5-(2,4-dihalophenyl)hydantoin with an alkali metal or alkaline earth metal hydroxide, carbonate or bicarbonate, and amine salts by contacting the compound with ammonium hydroxide or organic bases such as ethanolamine, ethylenediamine and the like. The sodium, potassium, lithium, calcium and magnesium salts are specific representative salts which may be prepared in this way.

EXAMPLE 1

A 50% aqueous ethanol solution (500 ml.) of 35 grams (0.2 mole) of 2,4-dichloro-benzaldehyde and 26 grams (0.4 mole) of potassium cyanide was stirred at room temperature for 45 minutes. Ninety-one grams (0.8 mole) of ammonium carbonate was then added and the mixture stirred under a reflux condenser at about 60° C. for 18.5 hours. The cooled solution was diluted with two liters of water and acidified with concentrated hydrochloric acid. After chilling the acidified solution, 40 grams (82%) of tan-colored crystals were isolated by filtration. Re crystallization from aqueous ethanol, and treatment with decolorizing charcoal, gave the white, crystalline 5-(2,4-dicholorphenyl)hydantoin which melted at 179.5–181° C. and analyzed as follows:

|  | Calculated for $C_9H_6N_2O_2Cl_2$ | Found |
| --- | --- | --- |
| Percent C | 44.1 | 44.0 |
| Percent H | 2.45 | 2.45 |
| Percent N | 11.4 | 11.6 |
| Percent Cl | 28.9 | 29.1 |

EXAMPLE 2

The procedure of Example 1 was followed using 2,4-dibromo-benzaldehyde, instead of the corresponding dichloro reactant, to produce 5,(2,4-dibromophenyl)hydantoin, M.P. 207–209° C.

*Analysis.*—Calcd.: C, 32.4; H, 1.8. Found: C, 32.7; H, 2.0.

By using a 2,4-dihalo-benzaldehyde with mixed halogens, such as 2-bromo-4-chloro-benzaldehyde, the corresponding 5-(2,4-dihalophenyl)hydantoin with mixed halogens is formed such as 5-(2-bromo-4-chloro-phenyl)hydantoin.

The 5-(2,4-dihalophenyl)hydantoins and especially those in which the halogen is bromine or chlorine or mixtures thereof unexpectedly possess unique and distinct plant growth regulating properties. For example, in tests with tomato plants, 5-(2,4-dichlorophenyl)hydantoin, when applied to the soil, uniquely affected the growth vigor of the plants. Six tomato plants, 7–8 inches tall, were treated with 5-(2,4-dichlorophenyl)hydantoin at dosage rates of 90 and 28 milligrams per pot as a soil drench. Three of the plants were treated with the 90 milligram dosage and three with the 28 milligram dosage. Three untreated plants were used as checks. Seven days after treatment, an epinastic response (curvature of the stems and leaves) was evident on all of the plants except the untreated checks and one of the treated plants. Fourteen days after treatment, it became evident that the 5-(2,4-dichlorophenyl)hydantoin was stimulating the development of floral clusters and causing the formation of parthenocarpic (seedless) fruit, as determined by petal retention on the developing ovary. Table I presents data on the condition of the blossom clusters. The first number in the series refers to the number of seedless fruit present; the second number to the number of open blooms; and the third number to the number of closed blooms. Each cluster is given a separate rating and since some plants contained two clusters, two readings are given.

*Table I*

| Treatment | Bloom Cluster Condition | | |
| --- | --- | --- | --- |
|  | Series 1 | Series 2 | Series 3 |
| 28 mg./pot | 0-3-2 | 0-1-5 | 1-2-3 |
| 90 mg./pot | 2-2-1 and 0-1-4 | 1-3-3 and 0-0-5 | 1-2-3 and 0-0-4 |
| check | 0-1-4 | 0-1-5 | 0-2-4 and 0-0-5 |

Nineteen days after treatment the plants were again rated and the data is presented in Table II.

Table II

| Treatment | Bloom Cluster Condition | | |
|---|---|---|---|
| | Series 1 | Series 2 | Series 3 |
| 28 mg./pot | 2-3-0 and 0-5-0 | 1-1-4 and 0-0-4 | 3-2-1 and 0-0-6 |
| 90 mg./pot | 3-0-2 and 0-2-2 | 3-2-0 and 0-1-4 | 4-0-2 and 0-0-5 |
| check | 0-2-3 and 0-0-4 | 0-2-4 and 0-0-4 | 1-2-3 and 0-0-5 |

Thus it may readily be seen that the application of the 5-(2,4-dichlorophenyl)hydantoin hastened the development of tomato blooms and caused the development of seedless fruit. Nineteen days after treatment, 2.7 fruit were set per treated plant versus 0.3 fruit per control plant. This one fruit on the control plant showed evidence of its seedless nature and may have been influenced to set from volatilized chemical from adjacent treated pots.

5-(2,4-dihalophenyl)hydantoins and non-toxic salts thereof of the present invention possess outstanding antiepileptic activity at an effective dosage level well below that providing any significant deleterious side effects.

The description and example given herein are not to be construed as limiting the scope of this invention and all modifications apparent to those skilled in the art are intended to be included.

What is claimed is:
1. A member of the group consisting of 5-(2,4-dihalophenyl)hydantoin and non-toxic salts thereof.
2. 5-(2,4-dihalophenyl)hydantoin.
3. 5-(2,4-dichlorophenyl)hydantoin.
4. 5-(2,4-dibromophenyl)hydantoin.
5. The ammonium salt of 5-(2,4-dihalophenyl)hydantoin.
6. An alkali metal salt of 5-(2,4-dihalophenyl)hydantoin.
7. An alkaline earth metal salt of 5-(2,4-dihalophenyl)hydantoin.
8. The sodium salt of 5-(2,4-dichlorophenyl)hydantoin.
9. The sodium salt of 5-(2,4-dibromophenyl)hydantoin.
10. The process which comprises reacting 2,4-dihalobenzaldehyde with an alkali metal cyanide in the presence of ammonia and carbon dioxide to form 5-(2,4-dihalophenyl)hydantoin.

References Cited in the file of this patent

Harvill et al.: Chem. Abstracts, vol. 38, col. 2025–6 (1944).
Ward: Chem. Abstracts, vol. 48, col. 5113 (1954).
Henze et al.: Chem. Abstracts, vol. 49, col. 15865 (1955).